Sept. 1, 1964     LE ROY C. KAHRE     3,147,079
PRODUCTION OF CARBON BLACK
Filed June 1, 1959
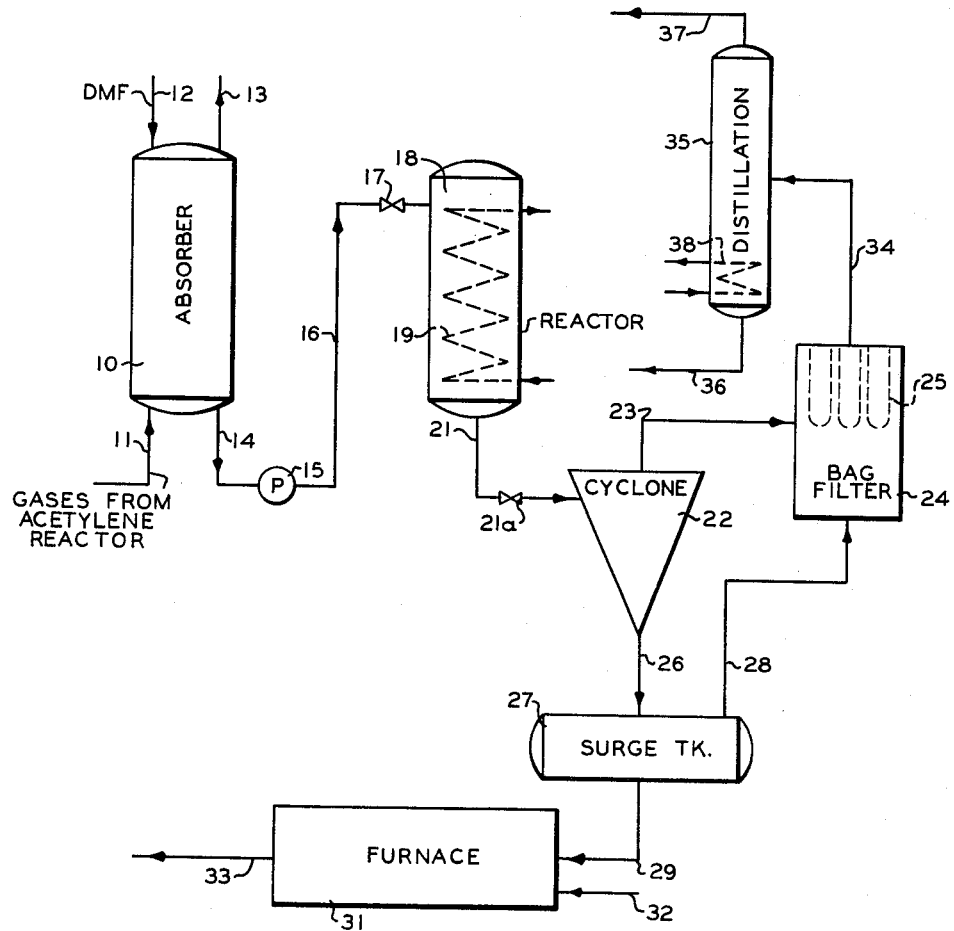
INVENTOR.
L.C. KAHRE
BY *Hudson and Young*
ATTORNEYS United States Patent Office 3,147,079
Patented Sept. 1, 1964

3,147,079
PRODUCTION OF CARBON BLACK
Le Roy C. Kahre, Bartlesville, Okla., assignor to Phillips Petroleum Company, a corporation of Delaware
Filed June 1, 1959, Ser. No. 817,129
4 Claims. (Cl. 23—209.4)

This invention relates to a method for preparing carbon black. In one aspect, the invention relates to a method for the recovery of high grade carbon black as a by-product in an acetylene recovery and purification process. In another aspect, this invention relates to a method for disposal of unstable heavy acetylenes such as diacetylene.

It is known that the recovery and purification of actylene can be effected by contacting an acetylene-containing gaseous stream with a solvent for acetylene, such as dimethylformamide, under conditions such that the acetylene is dissolved in the solvent and then by stripping or otherwise recovering the acetylene from the solution of acetylene in solvent. It is also known that at least some of the heavy acetylenes, for example, diacetylene, are unstable, particularly in concentrated form and at elevated temperatures. In copending application, Serial No. 441,809, filed July 7, 1954, by R. C. Scofield, now Patent No. 2,900,004, a process is disclosed wherein diacetylene is removed from the acetylene-containing stream by contacting such stream with a limited amount of a solvent for acetylene, such as dimethylformamide, so as to remove substantially all of the diacetylene from such stream without removing any appreciable quantity of acetylene. The diacetylene is then stripped from the solvent and is removed from the system in a relatively highly diluted stream and at relatively low temperature. The heavy acetylenes in general, and diacetylene in particular, are generally considered to be more unstable than acetylene when in concentrated form and at relatively high temperatures and pressures.

Due to the explosive nature of diacetylene, this compound is usually considered a dangerous nuisance in the processing of acetylene-containing streams and it has been the practice to remove this compound from the system as quickly as possible and dispose of it, usually by utilizing it as a component in fuel gas.

It is, therefore, a principal object of this invention to provide a method and means for disposing of unstable heavy acetylenes such as diacetylene. It is another object of this invention to provide a method for converting diacetylene into a high grade carbon black. Still another object of this invention is the provision of an apparatus for converting diacetylene into carbon black and recovering the solvent associated therewith for reuse in the acetylene recovery system. Still another object of this invention is the provison of a means for producing carbon black. Other objects and advantages will be apparent to one skilled in the art upon studying this disclosure including the detailed description of the invention and the drawing.

Broadly the invention contemplates dissolving diacetylene in a liquid solvent, heating the resulting solution to a temperature sufficient to initiate an exothermic reaction involving the diacetylene, and igniting a resulting solid so as to produce carbon black. The diacetylene usually is an unwelcome by-product in the preparation of actylene by the pyrolysis of a hydrocarbon and is dissolved in a solvent as a means of removing it from admixture with acetylene. I have discovered that the diacetylene contained in the solvent can be easily and safely disposed of and also converted into a valuable product by heating the solution so as to initiate an exothermic reaction producing a solid which, upon ignition in air, is converted into high grade carbon black.

The liquid solvent can be dimethylformamide, preferred because of its selectivity for the acetylenes and for its high boiling point.

The concentration of diacetylene in solvent should be at least about 4 weight percent and can be as high as the solubility of diacetylene in the solvent under the conditions of absorption. It is generally preferred to operate the absorption of diacetylene under such conditions that all of the diacetylene is removed from the acetylene-containing gas.

The exothermic reaction involving the diacetylene is initiated at a temperature considerably higher than the temperature of the absorption step. The more concentrated the solution, the lower the initiation temperature of the exothermic reaction, so that at about 4 weight percent of diacetylene in the solvent the reaction is initiated at a temperature 260 to 270° F. whereas the reaction begins at about 200° F. when the concentration of diacetylene is about 12 weight percent.

It is a feature of the invention that diacetylene is removed from admixture with acetylene and is converted into a valuable product without danger of forming an explosive mixture. The energy available in the diacetylene is utilized in converting the diacetylene into a reaction product which can be handled safely.

The diacetylene usually is absorbed in the solvent at low temperatures such as about −15 to about −50° F. The cold solution removed from the absorber can be warmed to a temperature generally not higher than about 100° F. by heat exchange with the solvent feed to the absorber. A temperature of about 70 to 80° F. is considered satisfactory as a safe and economical temperature range so as to avoid starting the reaction prior to entry to the reactor and to avoid quenching the reaction in the reactor.

In a continuous operation heat will generally be extracted from the reactor to control the reactor temperature and this can be done by circulating a cooling fluid through a coil contained in the reactor. The temperature in the reactor can be used to generate a signal to control the quantity of fluid admitted to the coil if such automatic control is desired. The temperature of the feed to the reactor can also be reduced to effect a reduction in the temperature in the reactor. Diluting the solution with additional solvent prior to entry to the reactor will also reduce the temperature in the reactor.

In the drawing, there is shown diagrammatically a specific embodiment of the invention employing dimethylformamide to absorb diacetylene from a charge of gas containing also acetylene and other gases, converting the diacetylene to carbon black and recovering dimethylformamide for reuse in the absorption process.

Referring now to the drawing, the gases from an acetylene generator (not shown) enter absorber 10 via conduit 11. A solvent such as dimethylformamide enters absorber 10 via conduit 12 and off-gases are removed via conduit 13. The solvent, containing water and heavy acetylenes, is removed from absorber 10 via conduit 14 and is passed by means of pump 15, conduit 16 and expansion valve 17 to reactor 18. Reactor 18 contains cooling coil 19 through which a cooling liquid can be circulated. The effluent from reactor 18 passes via conduit 21 to cyclone separator 22. A gas phase is removed via conduit 23 and is passed to filter 24 containing filter bags 25. Solids recovered from separator 22 are passed from cyclone separator 22 via conduit 26 to a surge chamber 27 wherein remaining gases are disengaged from the solids and passed via conduit 28 to bag filter 24. The solids are passed from surge tank 27 via conduit 29 to furnace 31 wherein the solids are heated in a controlled amount of air introduced via conduit 32 so as to produce a carbon black residue. The carbon black is removed from furnace 31 via conduit 33 and passed to facilities for cooling and packaging the finished carbon black product (not shown). The gases emerging from bag filter 24 via conduit 34 are at a temperature above their dew point and are passed to distillation column 35 from whence dimethylformamide is removed as kettle product via conduit 36 and water is removed as overhead product via conduit 37. Distillation column 35 is reboiled in the conventional manner by means of heater indicated at 38.

Considering now the operation of the apparatus shown in the drawing, a charge gas containing heavy acetylenes, including diacetylene, together with acetylene and other gases as shown in Table I is fed by way of conduit 11 to adsorber 10 wherein all of the diacetylene is absorbed along with some of the other acetylenes from the charged gases by contact with dimethylformamide, introduced to absorber 10 by way of conduit 12. Employing a tower top temperature of about −46° F. and a feed to solvent mol ratio of approximately 40, and a pressure of approximately 5 pounds per square inch gauge, substantially all of the diacetylene is removed from the gases leaving absorber 10 by way of conduit 13 on their way to the acetylene absorber (not shown). The bottoms product from absorber 10 comprising diacetylene and water dissolved in dimethylformamide is passed via conduit 14, pump 15, conduit 16 and expansion valve 17 to reactor 18 wherein the pressure is maintained at about 50 to 60 pounds per square inch gauge and the temperature is maintained in the range of about 400 to about 600° F. The bottoms product is removed from absorber 10 at a temperature of about −50° F. and is heated to a temperature of about 77° F. prior to entry into reactor 18. Heat can be supplied by heat exchange, referred to below. Coil 19 positioned in reactor 18 maintains the temperature in the reactor within the desired range by means of a heat exchange fluid which is circulated through the coil. The effluent from reactor 18 which comprises a mixture of liquid, vapor and finely divided solids is passed by means of conduit 21 through an expansion valve 21a whereby the liquid is flashed to a vapor and then to a vapor-solids separator herein indicated as cyclone separator 22 wherein the vapors comprising dimethylformamide and water are disengaged from the solids in cyclone separator and are passed, still in vapor form, through filters and thence to a distillation operation wherein the dimethylformamide is recovered as bottoms product and returned to the system and the overhead products are removed for further processing or disposal. The dimethylformamide bottoms products in line 36 can be heat-exchanged with the absorber bottoms products in line 16. The solids are removed from the cyclone separator in the form of finely-divided brown particles. The recovered solids are passed through a furnace in contact with a controlled amount of air and heated to just below the red heat so as to drive off the adsorbed organic contaminants and leave the carbon residue as the product of the process. The furnace can be, for example, a gas fired rotary kiln.

An analysis of the streams in a typical operation according to the process of this invention is shown in the following Table I wherein the stream numbers correspond to those in the drawing.

TABLE I

| Stream Number | Lb. Mols per Stream Day | | |
|---|---|---|---|
| | 11 (Absorber Feed) | 12 (DMF) | 14 (Absorber Kettle Product) |
| Component: | | | |
| $H_2$ | 23,724 | | |
| $N_2$ | 878 | | |
| $CO$ | 11,417 | | |
| $CH_4$ | 2,220 | | 1 |
| $C_2H_2$ | 3,532 | | 163 |
| $CO_2$ | 1,767 | | 9 |
| $C_3H_4$ | 732 | | 125 |
| $C_4H_2$ (diacetylene) | 137 | | 137 |
| $C_4H_4$ | 48 | | 18 |
| Dimethylformamide | | 1,107 | 1,107 |

The compositions in the above Table I show that 80,811 pounds of dimethylformamide in stream 14 contain 6860 pounds of diacetylene or 8.5 weight percent of diacetylene in the solution. The concentration of diacetylene in the feed stream to the absorber is about 2 weight percent or 0.31 volume percent and under the operating conditions all of the diacetylene is removed from the charge stream in absorber 10.

The following specific examples will be helpful in understanding the invention but are not to be construed as limiting the invention.

*Example I*

Diacetylene was prepared by the dehydrochlorination of 1,4-dichloro-2-butyne as described in Journal of Research of National Bureau of Standards, vol. 52, No. 2, published February 1954, and was dissolved in dimethylformamide so as to make a solution containing 12 weight percent of diacetylene in dimethylformamide. The solution was charged to a pressure vessel containing a temperature gauge and a pressure gauge, the temperature was reduced to about −100° F. by means of Dry Ice and air was evacuated from the pressure vessel. Heat was applied and the temperature was raise dto about 200° F. at which point an exothermic reaction began and without further addition of heat the temperature arose to about 400° F. and then subsided. The maximum pressure attained was 48 pounds per square inch absolute. The pressure vessel was cooled to room temperature, opened and the contents removed. The reaction products comprised a liquid phase, which was principally dimethylformamide with traces of water and a voluminous, finely-divided, brown colored solid. A sample of the brown solid was heated over an open gas flame in a porcelain crucible to a red heat temperature of the porcelain crucible and ignited. The heating was continued until all of the organic material was burned off leaving carbon black residue.

An analysis of the carbon black in the crucible showed that the carbon black had a surface area of 70 square meters per gram and an oil absorption value of 2.86 cc. per gram. These values correspond to those of acetylene black.

*Example II*

A solution of 5.3 weight percent of diacetylene in dimethylformamide was heated in the pressure vessel according to the procedure of Example I. The exothermic reaction occurred at about 230° F. and the temperature rose to about 240° F. The maximum pressure attained was 6 pounds per square inch absolute.

*Example III*

A solution of 4.6 weight percent diacetylene in dimethylformamide was heated in the pressure vessel according to the procedure of Example I. The exothermic reaction occurred at 261° F. and the temperature rose to a maximum of 281° F. The maximum pressure attained was 10 pounds per square inch absolute. The carbon black recovered represents about 90 to about 96 weight percent of the diacetylene dissolved in the solvent. Heating the solid reaction product to a temperature of about 1400 to about 1600° F. in the presence of air results in the production of the carbon black of this invention.

Reasonable variations and modifications are possible within the scope of the present disclosure without departing from the spirit and scope of the invention.

That which is claimed is:

1. The method of converting diacetylene contained in a gaseous mixture to carbon black which comprises contacting said gaseous mixture with an amount of dimethylformamide sufficient to dissolve the diacetylene present in said stream; recovering a solution of diacetylene in dimethylformamide; heating said solution under its own vapor pressure to a temperature above about 200° F. and sufficient to initiate an exothermic reaction; recovering unreacted dimethylformamide from said reaction; recovering solid reaction product from said reaction; igniting said solid reaction product in the presence of air; and recovering carbon black as a product of the process.

2. The method of converting diacetylene, contained in solution in dimethylformamide, to carbon black which comprises heating said solution to a temperature sufficient to initiate an exothermic reaction of said diacetylene; recovering a solid reaction product from said reaction; igniting said solid in the presence of oxygen; and recovering the carbon residue as the product of the process.

3. In the process of recovering acetylene from a gaseous mixture containing acetylene and diacetylene wherein the diacetylene is separated from the mixture and normally discarded, the improvement which comprises removing the diacetylene from the mixture as a diacetylene solution in dimethylformamide; heating said solution to a temperature above about 200° F. so as to initiate an exothermic reaction; recovering a solid reaction product from said reaction; igniting said solid in air at a temperature of about 1400 to about 1600° F.; and recovering carbon black as a product of the process.

4. A process which comprises contacting a diacetylene-containing stream with dimethylformamide in an absorption zone under conditions of temperature and pressure so as to dissolve substantially all of the diacetylene of said stream in said dimethylformamide; recovering a solution of diacetylene in dimethylformamide; adjusting the temperature of said solution to about 70 to about 80° F.; passing said solution to a reaction zone maintained at a temperature of about 400 to 600° F. and a pressure of about 50 to 60 p.s.i.g.; recovering a mixture of solids and vapors from reaction zone; separating said solids and vapors; condensing and recovering dimethylformamide from said vapors; returning dimethylformamide to said absorption zone; heating said solids to a temperature of about 1400 to 1600° F. in the presence of air, and recovering carbon black from said heating step as a product of the process.

References Cited in the file of this patent

UNITED STATES PATENTS

| | | |
|---|---|---|
| 2,714,940 | Milligan | Aug. 9, 1955 |
| 2,765,354 | Carpenter et al. | Oct. 2, 1956 |
| 2,768,060 | Follows | Oct. 23, 1956 |
| 2,838,133 | Schreiner | June 10, 1958 |
| 2,846,443 | Malusa et al. | Aug. 5, 1958 |
| 2,907,801 | Johnson et al. | Oct. 6, 1959 |